United States Patent [19]

Stöger

[11] Patent Number: 5,418,669

[45] Date of Patent: May 23, 1995

[54] MAGNETIC-TAPE CASSETTE HAVING A PRESSURE-MEMBER SUPPORT AND A TAPE-GUIDE-MEMBER SUPPORT WHICH INDEPENDENTLY ENGAGE COMMON ABUTMENTS THEREIN

[75] Inventor: Anton Stöger, Vienna, Austria

[73] Assignee: U.S. Philips Corporation, New York, N.Y.

[21] Appl. No.: 161,952

[22] Filed: Dec. 2, 1993

[30] Foreign Application Priority Data

Feb. 17, 1993 [AT] Austria ................................. 298/93

[51] Int. Cl.$^6$ .......................................... G11B 15/60
[52] U.S. Cl. ........................ 360/130.33; 360/130.21
[58] Field of Search .................. 360/130.33, 130.21

[56] References Cited

U.S. PATENT DOCUMENTS 4,747,007 5/1988 Ikebe et al. ............... 360/130.33 X
4,860,967 8/1989 Meermans ................ 360/130.33 X

FOREIGN PATENT DOCUMENTS 0203417 12/1986 European Pat. Off. ... G11B 23/087
0492705 7/1992 European Pat. Off. ..... G11B 15/62
3414018 10/1984 Germany ................... G11B 23/087

Primary Examiner—A. J. Heinz
Attorney, Agent, or Firm—Brian J. Wieghaus

[57] ABSTRACT

A magnetic tape having an elongate pressure-member support for supporting a pressure member and an elongate tape-guide-element support for supporting two tape guide elements. Two abutment parts are arranged at the location of side portions of the pressure-member support and the tape-guide-element support and take up the forces exerted by the side portions when the magnetic head cooperates with the pressure member and the tape-guide elements. The pressure-member support has at least one opening in each of the two areas of its side portions which face the abutment parts. The abutment parts and/or the tape-guide-element support have projections at parts of the side portions which face the abutment parts projecting towards the facing part of said two parts which projections are arranged to correspond to the openings in the pressure-member support.

18 Claims, 3 Drawing Sheets

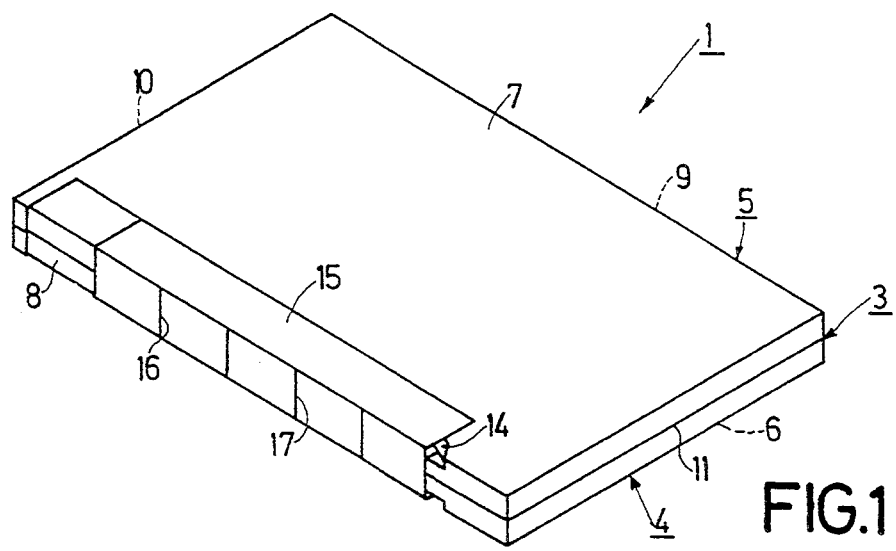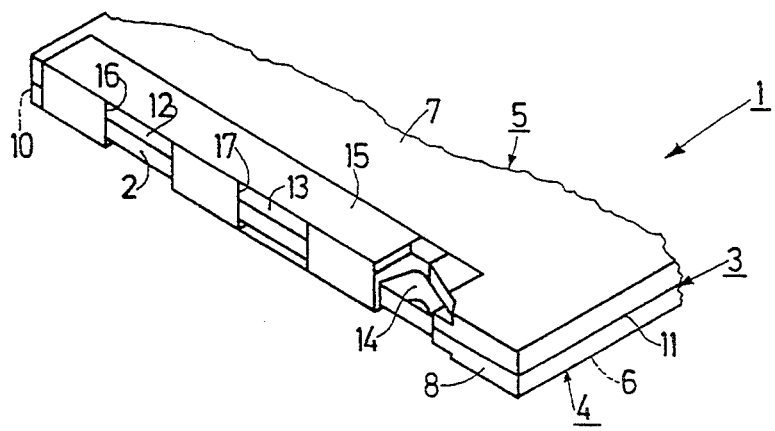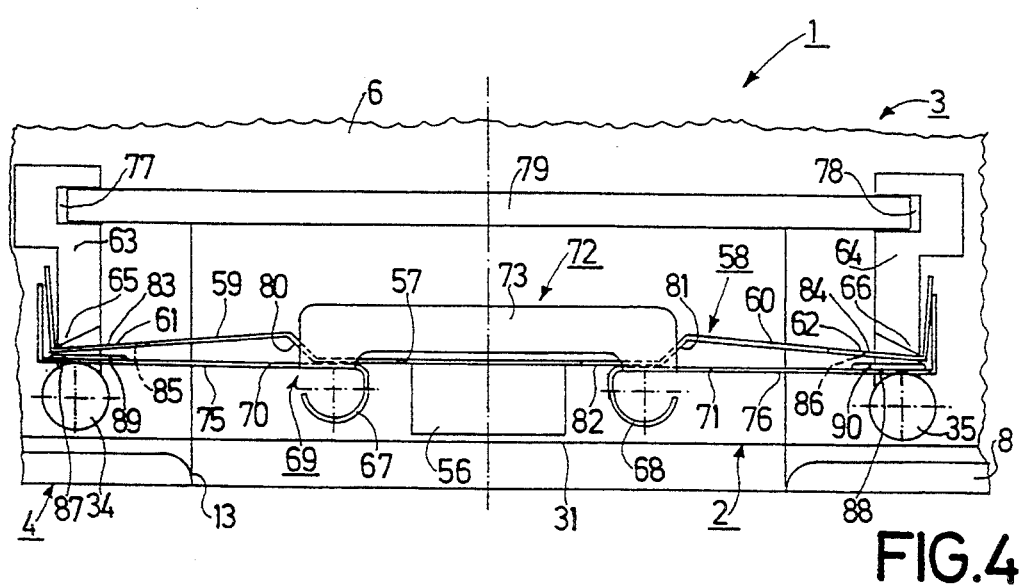

MAGNETIC-TAPE CASSETTE HAVING A PRESSURE-MEMBER SUPPORT AND A TAPE-GUIDE-MEMBER SUPPORT WHICH INDEPENDENTLY ENGAGE COMMON ABUTMENTS THEREIN

BACKGROUND OF THE INVENTION

The invention relates to a cassette for holding a magnetic tape which can be guided inside the cassette along a side wall thereof which has an access opening through which at least one magnetic head can be brought into scanning contact with the magnetic tape by insertion of said magnetic head into the cassette. The cassette includes a pad-like pressure member adapted to press a magnetic tape against the inserted magnetic head, which pressure member is movable transversely of the side wall and is secured to a central portion of a substantially elongate blade-spring-like pressure-member support which is arranged to extend substantially parallel to the side wall with the access opening and has side portions situated adjacent the central portion. The cassette further includes two tape-guide elements adapted to guide a magnetic tape past the inserted magnetic head. The tape-guide elements are movable substantially transversely of the side wall and are arranged substantially mirror-symmetrically relative to the pressure member on a substantially elongate blade-spring-like tape-guide-element support which is arranged to extend substantially parallel to the side wall and substantially between the pressure-member support and the side wall. The tape-guide-element support has side portions which are also situated adjacent its central portion, and two abutment parts which are arranged in the area of the side portions of the pressure-member support and the tape-guide-element support at their sides which are remote from the side wall, and which, with a magnetic head inserted, take up the forces exerted by the side portions of the pressure-member support and the tape-guide-element support.

The invention also relates to a pressure-member support for a cassette as defined in the first paragraph, which support is of a substantially elongate and blade-spring-like construction and comprises a central portion for securing a pressure member and, situated adjacent the central portion, two side portions adapted to cooperate with abutment parts of the cassette.

The invention further relates to a tape-guide-member support for a cassette as defined in the first paragraph, which support is of a substantially elongate and blade-spring-like construction and comprises a central portion and two side portions which are situated adjacent the central portion and which are adapted to cooperate with abutment parts of a cassette, which support carries two tape-guide elements adapted to guide a magnetic tape.

A cassette of the type defined in the first paragraph, a pressure-member support of the type defined in the second paragraph, and a tape-guide-member of the type defined in the third paragraph are known from EP 0,492,705 A1.

In the cassette known from EP 0,492,705 A1 and shown in FIG. 6 of EP 0,492,705 A1 each of the two side portions of the pressure-member support directly abuts against an abutment pan. The two side portions of the tape-guide-element support, however, abut against the two abutment parts via the two side portions of the pressure-member support. As a result of this, the two side portions of the tape-guide-element support exert a force on the two side portions of the pressure-member support, which is unfavourable because the forces exerted on the side portions of the pressure-member support by the side portions of the tape-guide-element support limit the movability of the pressure-member support and, consequently, of the pressure member carried by this pressure-member support, which has a considerable influence on the force exerted on an introduced magnetic head by the pressure member. As a result of this, said force exerted on an introduced magnetic head by the pressure member becomes increasingly dependent upon tolerances of the penetration depth of the magnetic head. Moreover, owing to the abutment of the tape-guide-element support against the pressure-member support with the inserted magnetic head, the effect occurs that the pressure applied to the magnetic head by the pressure member exhibits a comparatively large hysteresis, and it has been found that larger pressure forces occur in dependence upon the insertion path during insertion of a magnetic head into the cassette than during removal of a magnetic head from the cassette. Such a hysteresis of the pressure force is undesirable because in operation this leads to undefined force relationships which depend to a comparatively large extent on penetration depth tolerances.

SUMMARY OF THE INVENTION

It is an object of the invention to preclude the above problems with a cassette of the type defined in the first paragraph and to provide a solution with which the movability of the pressure-member support and the pressure which can be applied by the pressure member are not influenced by the abutment of the tape-guide-element support when a magnetic head has entered a cassette.

To this end, the invention is characterized in that the pressure-member support has at least one opening in each of the two areas of its side portions which face the abutment parts, and of each abutment part and the part of a side portion of the tape-guide-element support which faces said abutment part at least one of said two parts has at least one projection projecting towards the facing part of said two parts and arranged to correspond to the respective opening in the pressure-member support. The pressure-member support, with a magnetic head inserted, abuts against the abutment parts with its portions bounding the openings in its side portions, and the tape-guide-element support and the abutment parts abut against each other with the projections which engage the openings in the pressure-member support. In this manner it is achieved that when a magnetic head has been inserted into a cassette both the pressure-member support with its two side portions and the tape-guide-element support with its two side portions abut separately and fully independently of one another against the abutment parts in the cassette, so that the pressure-member support and the tape-guide-element support do not influence one another. This results in a comparatively easy movability of the side portions of the pressure-member support relative to the abutment parts, which is influenced merely by the friction between the abutment parts and the pressure-member support. This is advantageous in order to achieve that the pressure forces for pressing the magnetic tape against an inserted magnetic head by means of the pressure member are tolerance independent to a maximal extent and lie within a comparatively narrow tolerance range.

It is found to be advantageous if each opening in a side portion of the pressure-member support is formed by an elongate slot which extends in the longitudinal direction of the pressure-member support. This is advantageous in order to ensure that the projections are clear of the openings in the pressure-member support, the resulting clearance being independent of the penetration depth of a magnetic head into the cassette.

In this respect it is also found to be advantageous if in each side portion the pressure-member support has only one slot arranged substantially symmetrically relative to a longitudinal central axis of the pressure-member support. This is favourable for a stable construction of the pressure-member support at the locations where the pressure-member support should abut against the abutment parts.

It is found to be particularly advantageous if the projections are arranged on the two side portions of the tape-guide-element support only on the two parts facing the two abutment parts. This is advantageous for a simple manufacture of the abutment parts, particularly for a simple demoulding of the abutment parts when these are manufactured from a plastic.

It is also found to be advantageous if each projection on a part of a side portion of the tape-guide-element support is formed by an elongate embossment in the respective side portion, which embossment extends in the longitudinal direction of the tape-guide-element support. This simplifies the construction of the projections. Such projections may also be constructed as separate parts secured to the tape-guide-element support, but this is more intricate and more expensive.

It is found to be particularly advantageous if each side portion of the tape-guide-element support has only one embossment arranged substantially symmetrically relative to a longitudinal central axis of the tape-guide-element support. This results in a certain movability of the tape-guide-element support, i.e. a pivotal movement about the elongate embossments, when the tape-guide-element support abuts with the abutment parts, which is favourable for an optimum guidance of the magnetic tape past an inserted magnetic head.

According to the invention a pressure-member support for a cassette in accordance with the invention is characterized in that the pressure-member support has at least one opening in the two areas of its side portions which are adapted to cooperate with abutment parts of the cassette.

With such a pressure-member support it is found to be advantageous if each opening in a side portion of the pressure-member support is formed by an elongate slot which extends in the longitudinal direction of the pressure-member support.

In this respect it is found to be very advantageous if in each side portion the pressure-member support has only one slot arranged substantially symmetrically relative to a longitudinal central axis of the pressure-member support.

According to the invention a tape-guide-element support for a cassette in accordance with the invention is characterized in that in each of both areas of its side portions which are adapted to cooperate with abutment parts of a cassette the tape-guide-element support has at least one projection.

With such a tape-guide-element support it is found to be advantageous if each projection in an area of a side portion of the tape-guide-element support is formed by an elongate embossment in the respective side portion, which embossment extends in the longitudinal direction of the tape-guide-element support.

In this respect it is found to be very advantageous if in each side portion the tape-guide-element support has only one embossment arranged substantially symmetrically relative to a longitudinal central axis of the tape-guide-element support.

BRIEF DESCRIPTION OF THE DRAWINGS

The invention will now be described in more detail with reference to the drawings which show an exemplary embodiment to which the invention is not limited.

FIG. 1 is a diagrammatic oblique view of a cassette which comprises a shutter which is movable along a first side wall between a closed position and an open position to cover access openings provided in a first long side wall, the shutter being shown in its closed position.

FIG. 2 shows the cassette of FIG. 1 in the same way as in FIG. 1, the cassette being partly cut-away and the shutter being shown in its open position.

FIG. 4 shows a part of the cassette of FIGS. 1, 2 and 3 comprising the pressure-member support and the tape-guide-element support to a larger scale than FIG. 3.

DESCRIPTION OF THE PREFERRED EMBODIMENT

Figure 3:
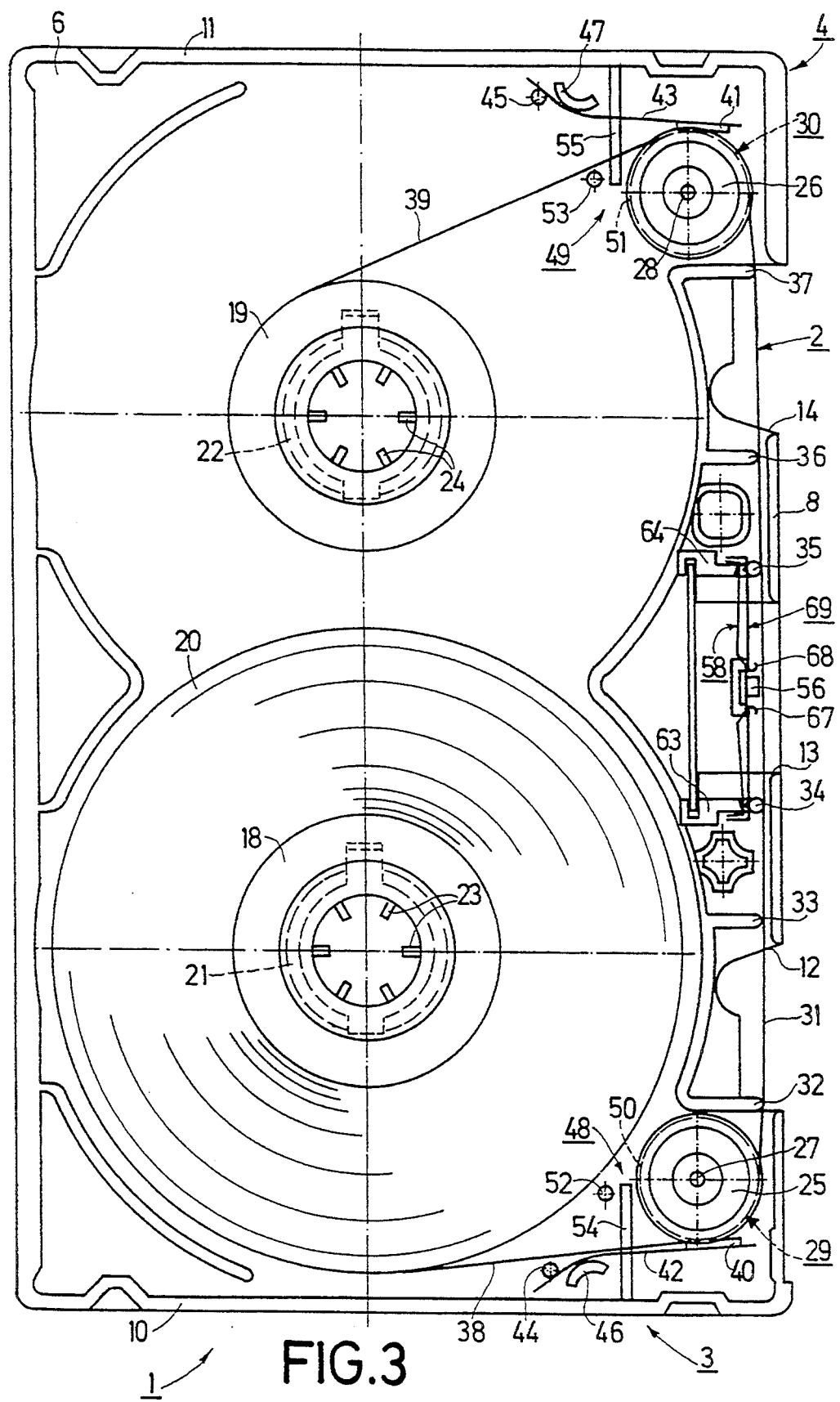
FIG. 3 is a plan view to approximately twice full-scale, showing a trough-shaped lower housing half of the cassette shown in FIGS. 1 and 2, in which housing half two reel hubs, the magnetic tape between these hubs, a pressure-member support and a tape-guide-element support are arranged adjacent one another at the location of a central access opening.
Figure 5:
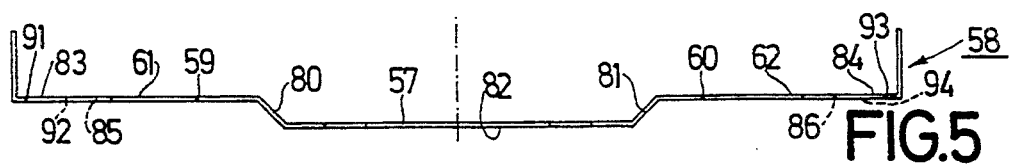
FIG. 5, in the same way as FIG. 4, shows only the pressure-member support in plan view in its original shape before it is mounted in a cassette as shown in FIG. 1.

FIGS. 1 and 2 show a cassette 1 for accommodating a magnetic tape 2. The cassette 1 has a rectangular housing 3 comprising a lower trough-shaped housing half 4 and an upper trough-shaped housing half 5. The housing 3 has a lower wall 6, not shown in FIGS. 1 and 2, an upper wall 7, a first long side wall 8, which faces a second long side wall 9, not shown in FIGS. 1 and 2, a first short side wall 10, not shown in FIGS. 1 and 2, and a second short side wall 11. The first long side wall 8 has three openings 12, 13 and 14. The opening 12 extends also into the lower wall 6 of the housing 3 of the cassette 1. The opening 14 also extends into the lower wall 6 and into the upper wall 7 of the housing 3 of the cassette 1. The openings 12, 13 and 14 form access openings giving access to the magnetic tape 2 in the cassette 1, the central access opening 13 allowing a magnetic head, not shown, to enter the cassette 1 for scanning the magnetic tape. In order to close the access openings 12, 13 and 14 the cassette 1 has a sheet-metal shutter 15 of substantially U-shaped cross-section, which shutter is guided on the housing 3 of the cassette 1 so as to be movable between a closed position shown in FIG. 1 and an open position shown in FIG. 2, a return spring, not shown, acting upon the shutter 15 to urge this shutter into its closed position shown in FIG. 1. The shutter 15 has two openings 16 and 17 through which the access openings 12 and 13 in the first long side wall 8 of the housing 3 of the cassette 1 are accessible when the shutter 15 is in its open position.

As is shown in FIG. 3 the cassette 1 shown in FIGS. 1 and 2 accommodates two juxtaposed reel hubs 18 and 19 which are rotatably supported relative to the lower wall 6 and the upper wall 7, the entire magnetic tape 2 being wound onto the reel hub 18 to form a tape spool 20 in the situation illustrated in FIG. 3. At both ends the magnetic tape 2 is attached to a length of leader tape, not shown, connected to the reel hubs 18 and 19 in a manner, not shown. For rotatably supporting the two reel hubs 18 and 19 substantially ring-shaped ridges project from the lower wall 6 and the upper wall 7, the ridges provided on the lower housing half 4 bearing the reference numerals 21 and 22 in FIG. 3. Inner portions of the reel hubs 18 and 19, which are also substantially ring-shaped, carry pin-shaped inward projections 23 and 24 adapted to cooperate with reel spindles of a recording and reproducing apparatus constructed for cooperation with the cassette 1.

The cassette 1 further has two tape-guide rollers 25 and 26 arranged in the area of the ends of the first long side wall 8 and extending perpendicularly to the lower wall 6 and the upper wall 7. The tape-guide rollers 25 and 26 are each rotatably supported on a mounting pin 27 and 28, respectively, which project perpendicularly from the lower wall 6. The magnetic tape 2 is wrapped around each of the two tape-guide rollers 25 and 26 in a contact area 29 and 30, respectively. Between the two tape-guide rollers 25 and 26 a tape section 31 of the magnetic tape 2 extends along the first long side wall 8. In addition to the two tape-guide rollers 25 and 26 guide ribs 32 and 33, projecting perpendicularly to the lower wall 6 of the housing half 4, guide pins 34 and 35, and further guide ribs 36 and 37 have been provided to guide the tape section 31. A further tape section 38, 39 extends from each of the two tape-guide rollers 25 and 26, respectively, to one of the two reel hubs 18 and 19, respectively, each of the two further tape sections 38 and 39 extending respectively towards the tape spool on a reel hub 18 and 19.

The cassette 1 further accommodates two cleaning pads 40 and 41, each carried by a pad support, 42 and 43 respectively, mounted in the lower housing half 4 of the housing 3. The two pad supports 42 and 43 each simply comprise a blade spring, one end of each spring being inserted between a pin-shaped abutment, 44 and 45 respectively, and an arcuate abutment, 46 and 47 respectively, and the free ends of said springs carrying the cleaning pads 40 and 41, respectively, which are connected to the blade springs 42 and 43, respectively, for example by means of an adhesive. The abutments 44, 45, 46 and 47 are integral with the lower wall 6 and project perpendicularly from this wall. The cleaning pads 40 and 41 consist of, for example, a felt-like material or a flake material. The two cleaning pads 40 and 41 are pressed against the magnetic tape 2 wrapped around tape-guide rollers 25 and 26, respectively, in the respective contact area 29 or 30 of said tape-guide rollers 25 and 26.

As is shown in FIG. 3, the present cassette 1 comprises additional tape guides 52 and 53, oriented perpendicularly to the lower wall 6 and the upper wall 7, in areas 48 and 49 respectively which are wedge-shaped in a plan view of the upper wall 7 and the lower wall 6, which area is situated between the further tape section 38 or 39 leading away from the tape-guide roller 25 or 26, in whose contact area 29 or 30 the cleaning pad 40 or 41 is pressed against the magnetic tape 2, and the circumferential portion 50 or 51 of this tape-guide roller 25 or 26 which is not in contact with the magnetic tape 2 and which adjoins said further tape section 38 or 39. The position of the additional tape guide 52 or 53 in the wedge-shaped area 48 or 49 is suitably selected in such a manner that in normal operation of the cassette 1 the additional tape guide 52 or 53 is not in contact with the further tape section 38 or 39, as is apparent from FIG. 3. The further tape section 38 or 39 is only in contact with the additional tape guide 52 or 53 when a tape loop 54 is formed and the additional tape guide 52 or 53 then guides the further tape section 38 or 39 perpendicularly to the lower wall 6 and the upper wall 7 in its area directly before the tape-guide roller 25 or 26. In a particularly simple manner the additional tape guides 52 and 53 each consist of a stationary cylindrical tape-guide pin.

As can be seen in FIG. 3, a tape-guide rib 54, 55 is connected to and projects from the lower wall 6 and crosses the further tape section 38 or 39 in the respective wedge-shaped area 48 or 49 between the additional tape guide 52 or 53 and the respective tape-guide roller 25 or 26. Two such tape-guide ribs are connected to the upper wall 7 in the same way so that the two tape-guide ribs which are situated above one another coincide in a plan view of the upper wall 7 and the lower wall 6.

As is apparent from FIGS. 3 and 4, the cassette 1 comprises a pad-like elastic pressure member 56 for pressing the magnetic tape 2 against a magnetic head, not shown, which pressure member is movable transversely of the side wall 8 with the access opening 13 between a rest position shown in FIGS. 3 and 4 and at least one contact position, not shown. The pressure member 56 is block-shaped and is made of, for example, a felt-like material or a flake material. The pressure member 56 is attached to a central portion 57 of a substantially elongate strip-shaped blade-spring-like pressure-member support 58. The pressure-member support 58 is arranged to extend substantially parallel to the side wall 8. In addition to its central portion 57 the pressure-member support 58 has two side portions 59 and 60 adjacent the central portion 57. With their surfaces 61 and 62 which are remote from the side wall 8 the two side portions 59 and 60 can be made to cooperate with abutment parts 63 and 64 of the cassette. In the present case the abutment parts 63 and 64 of the cassette are formed by two ridges which project perpendicularly from the lower wall 6 of the housing 3 of the cassette 1 and whose ends 65 and 66 which face the side portions 59 and 60 of the pressure-member support 58 are wedge-shaped. The side portions 59 and 60 of the pressure-member support 58 can abut against said wedge-shaped ends 65 and 66 of the ridges 63 and 64.

As is also apparent from FIGS. 3 and 4, the cassette 1 accommodates two tape-guide elements 67 and 68 for guiding the magnetic tape 2 past a magnetic head, not shown, which guide elements are movable transversely of the side wall 8 and are arranged essentially mirror-symmetrically relative to the pressure member 56. In the present case the two tape-guide elements 67 and 68 are provided on a substantially elongate strip-shaped blade-spring-like tape-guide-element support 69 and are formed by arcuate central end portions of two side portions 70 and 71 of the tape-guide-element support 69. The two side portions 70 and 71 of the tape-guide-element support 69 are interconnected by a central portion 72 formed by two central limbs 73 and 74 which extend substantially perpendicularly relative to the two side portions 70 and 71 and of which only the central limb 73 nearest the upper wall 7 of the housing 3 of the cassette 1 is visible in FIGS. 3, 4 and 8. The blade-spring-like tape-guide-element support 69 is arranged to extend substantially parallel to the side wall 8 and substantially between the pressure-member support 58 and the side wall 8. The two side portions 70 and 71 adjoining the central portion 72 of the tape-guide-element support 69 can be made to cooperate with positioning elements of the cassette with their surfaces 74 and 75 which face the side wall 8. In the present cassette 1 these positioning elements are formed by the afore-mentioned guide pins 34 and 35 for guiding the magnetic tape 2 and project perpendicularly from the lower wall 6 of the housing 3 of the cassette 1.

It is to be noted also that in their end portions which are remote from the side wall 8 the abutment parts 63 and 64 each have a recess 77 and 78 in which a shielding element 79 of a sheet material is mounted.

Moreover, it is to be noted that a magnetic-tape cassette comprising a pressure member carried by a pressure-member support and two tape-guide elements provided on a tape-guide-element support, and the cooperation of the pressure member and the two tape-guide elements with a magnetic head are known per se from EP 0,492,705 A1 (which correspond to U.S. Pat. No. 5,309,302 herewith incorporated by reference).

As is apparent from FIGS. 3, 4, 5, 6 and 7 the pressure-member support 58 has a stepped portion, 80 and 81, in each of the transitional areas between its central portion 57 and its two side portions 59 and 60, which stepped portions 80 and 81 are situated substantially mirror-symmetrically relative to the pressure member 56 and the central portion 57 of the pressure-member support 58. Owing to the stepped portions 80 and 81 the central portion 57 is offset relative to the two side portions 59 and 60 towards the side wall 8 and towards the lateral surface 82 of the central portion 57, which surface serves for mounting the pressure member 56. When the pressure member 56 is in its rest position the central portion 57 of the pressure-member support 58, as is shown in FIGS. 3 and 4, is supported on the tape-guide-element support 69 with pretension, the areas of the central portion of the pressure-member support 58 which adjoin the stepped portions 80 and 81 bearing against the areas of the side portions 70 and 71 of the tape-guide-element support 69 which adjoin the tape guides 67 and 68. The two stepped portions 80 and 81 may be oriented substantially perpendicularly to the central portion 57 and to the side portions 59 and 60 of the pressure-member support 58. However, in the cassette shown in FIGS. 1 to 4 the stepped portions 80 and 81 of the pressure-member support 58 may be inclined relative to the central portion 57 and relative to the two side portions 59 and 60 of the pressure-member support 58, which is advantageous for a simple construction of the stepped portions 79 and 80. In practice, it is found to be particularly advantageous if the stepped portions 80 and 81 of the pressure-member support 58 have a height of approximately 0.7 mm measured perpendicularly to the central portion 57.

Since the pressure-member support 58 is pretensioned relative to the tape-guide-element support 69 it is achieved in a very simple manner and substantially without any additional means that, when the pressure member 56 is in its rest position and the tape-guide elements 67 and 68 are in their rest positions, i.e. if no magnetic head has been introduced into the cassette 1, both the pressure-member support 58 and the tape-guide-element support 69 with their two respective side portions 59, 60 and 70, 71 always engage against the respective abutment parts 63, 64 and positioning elements 34, 35 provided for this purpose on the cassette, as a result of which a loose arrangement of the two supports 58 and 69 in the cassette 1 is avoided, so that these supports cannot produce any annoying noises when the cassette 1 is subjected to shocks or vibrations. Moreover, by pretensioning the pressure-member support 58 and supporting it on the tape-guide-element support 69 it is achieved that the two supports 58 and 69 are always suitably positioned by the abutment parts 63, 64 and positioning elements 34, 35 provided for this purpose, so that both the pressure member 56 and the two tape-guide elements 67 and 68 always occupy positions parallel to the magnetic tape 2. Moreover, by pretensioning the pressure-member support 58 it is achieved that as a result of the pretension of the pressure-member support 58, even if the penetration depth of a magnetic head into the cassette 1 is small, the pressure member 56 is always pressed against a magnetic head with an adequate pressure. By pretensioning the pressure-member support 58 it is also achieved that pressure-member support 58 can have a flat spring characteristic and, consequently, the resulting pressure forces are comparatively independent of tolerances of the penetration depth of magnetic heads. A particular advantage of the cassette 1 in accordance with the exemplary embodiment described above is that for supporting the pretensioned pressure-member support 58 use is made of the tape-guide-element support 69 which is anyway present in the cassette 1, so that no separate abutments are needed for taking up the forces exerted by the pretensioned pressure-member support 58.

Both the pressure-member support 58 and the tape-guide-element support 69 are made of a blade-spring metal. The choice of the material and the material thickness are such that the tape-guide-element support 69 has a substantially higher stiffness than the pressure-member support 58, so that the tape-guide-element support 69 can serve as an abutment for the pretensioned pressure-member support 58, it being nevertheless ensured that when a magnetic head enters the cassette 1 both the pressure-member support 58 and the tape-guide-element support 69 are movable correctly and without the application of large actuating forces. It is advantageous if the tape-guide-element support 69 is made of spring steel and the pressure-member support 58 is made of spring bronze. However, the two supports 58 and 69 may also be made of synthetic materials.

When a magnetic tape enters the cassette 1 it first abuts against the pressure member 56 and subsequently against the tape-guide elements 67 and 68, both the pressure-member support 58 and the tape-guide-element support 69 being moved towards the cassette interior with their central portions 57 and 72, so that the side portions 59 and 60 of the pressure-member support 58 and the side portions 70 and 71 of the tape-guide-element support 69 are deflected elastically. The abutment parts 63 and 64 then take up the forces exerted by the side portions 59 and 60 of the pressure-member support 58 and by the side portions 70 and 71 of the tape-guide-element support 69 when the magnetic head is inserted.

As is apparent from FIGS. 4, 5, 6 and 7, the pressure-member support 58 has an opening 85 and 86 in both areas 83 and 84 of its side portions 59 and 60 which face the abutment parts 63 and 64.

As is further apparent from FIGS. 4, 8, 9 and 10, the tape-guide-element support 69 has at least one projection, 89 and 90 respectively, in both areas 87 and 88 of its side portions 70 and 71 which face the abutment parts 63 and 64, which projections project towards a respective abutment part 63 or 64 and arranged to correspond to the respective openings 85 and 86 in the pressure-member support 58.

By means of this construction of the pressure-member support 58 and of the tape-guide-element support 69 in their respective areas 83, 84 and 87, 88 which face the abutment parts 63 and 64 it is achieved that with a magnetic head inserted into the cassette 1 the pressure-member support 58 abuts against the abutment parts 63 and 64 with the portions 91, 92 and 93, 94 bounding the openings 85 and 86 in the side portions 59 and 60, and the tape-guide-element support 69 abuts against these abutment parts with its projections 89 and 90 which engage the openings 85 and 86 in the pressure-member support 58, i.e. against the wedge-shaped ends 65 and 66 of the abutment parts 63 and 64. The dimensions of the openings 85 and 86 and of the projections 89 and 90 are selected and adapted to one another in such a manner that neither the projections 89 and 90 nor other parts of its side portions 70 and 71 of the tape-guide-element support 69 press against the portions 91, 92 and 93, 94 bounding the openings 85 and 86 in the side portions 59 and 60 of the pressure-member support 58.

Figure 6:
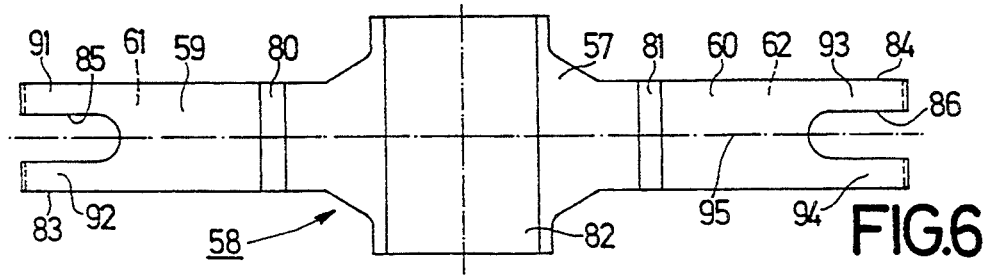
FIG. 6 is a front view of the pressure-member support shown in FIG. 5.
Figure 7:
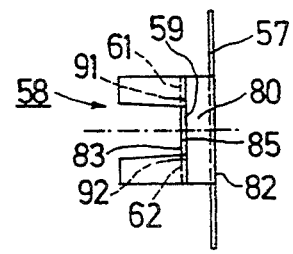
FIG. 7 is a side view of the pressure-member support shown in FIGS. 5 and 6.

As is apparent in particular from FIG. 6, each opening 85 or 86 in a side portion 59 or 60 of the pressure-member support 58 is formed by a slot which extends in the longitudinal direction of the pressure-member support 58. This slot 85, 86 is arranged symmetrically relative to a longitudinal central axis 95 of the pressure-member support 58.

Figure 8:
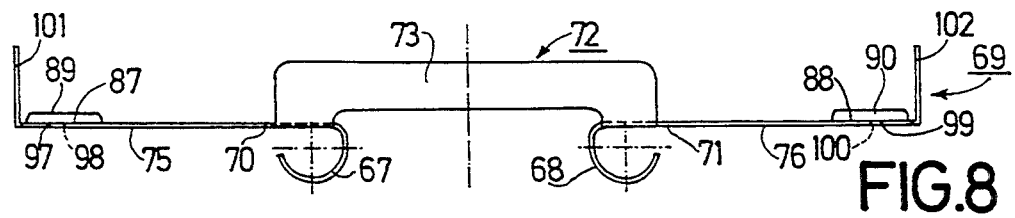
FIG. 8, in the same way as FIG. 4, shows only the tape-guide-element support in plan view in its original shape before it is mounted in a cassette as shown in FIG. 1.
Figure 9:
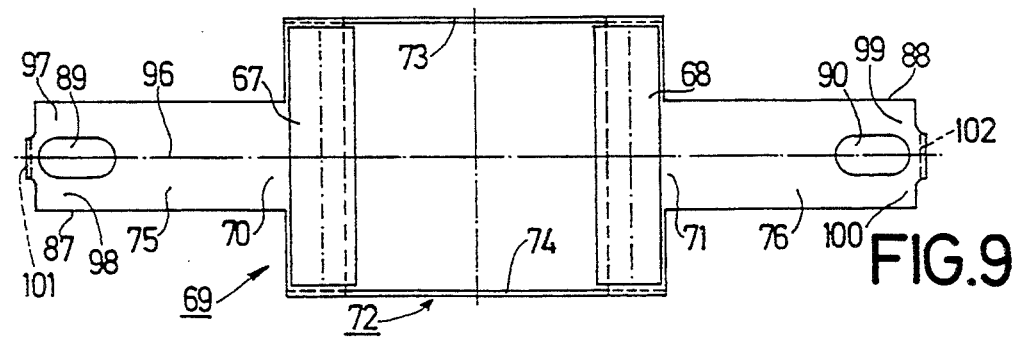
FIG. 9 is a front view of the tape-guide-element support shown in FIG. 8.

As is apparent from FIGS. 4, 8, 9 and 10, each projection 89, 90 at the location of a side portion 70, 71 of the tape-guide-element support 69 is formed by an elongate embossment in the respective side portion 70 or 71, which embossment extends in the longitudinal direction of the tape-guide-element support 69. Each of the two elongate embossments 89 and 90 is arranged symmetrically relative to a longitudinal central axis 96 of the tape-guide-element support 69, as can be seen in FIG. 9.

Figure 10:
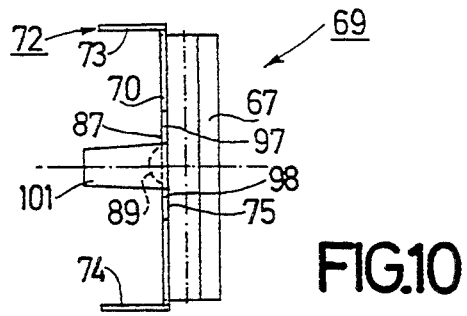
FIG. 10 is a side view of the tape-guide-element support shown in FIGS. 8 and 9.

In the tape-guide-element support 69 shown in FIGS. 8, 9 and 10 the parts 97, 98 and 99, 100 of the side portions 70 and 71 of the tape-guide-element support 69, which parts are situated beside the projections 89 and 90 in relation to the longitudinal central axis 96, extend up to the bent tabs 101 and 102 of the side portions 70 and 71 of the tape-guide-element support 69. Tests have shown that it is also very advantageous if the parts 97, 98 and 99, 100 do not extend as far as the tabs 101 and 102, i.e. are shortened, which increases the likelihood that at the location of the parts 97, 98 and 99, 100 of the side portions 70 and 71 of the tape-guide-element support 69, which parts are situated beside the projections 89 and 90, there will be no contact with the portions 91, 92 and 93, 94 bounding the openings 85 and 86 in the side portions 59 and 60 of the pressure-member support 58 and, as a consequence, there will be no undesired interaction between the tape-guide-element support 69 and the pressure-member support 58.

Owing to the above construction of the pressure-member support 58 and the tape-guide-element support 69 it is achieved in a very simple manner that both the pressure-member support 58 with its two side portions 59, 60 and the tape-guide-element support 69 with its two side portions 70, 71 abut separately and fully independently of one another against the abutment parts 63 and 64 in the cassette, so that the pressure-member support 58 and the tape-guide-element support 69 do not influence one another. This results in a comparatively easy movability of the side portions 59 and 60 of the pressure-member support 58 relative to the abutment parts 63 and 64, which is influenced merely by the friction between the abutment parts 63 and 64 and the pressure-member support 58, which is advantageous in order to achieve that the pressure forces for pressing the magnetic tape 2 against a magnetic head inside the cassette 1 by means of the pressure member 56 are tolerance independent to a maximal extent and lie within a comparatively narrow tolerance range.

The above description of the invention is based on a magnetic-tape cassette for accommodating a magnetic tape, which has already been loaded with a magnetic tape. However, the invention can also be applied to a so-called empty cassette in which only a leader tape has been attached to the two reel hubs of the cassette, the cassette not yet being loaded with a magnetic tape. In another embodiment of a cassette in accordance with the invention the pressure-member support may alternatively have two openings which are disposed mirror-symmetrically relative to a longitudinal central axis of the pressure-member support in the two parts of its side portions facing the abutment parts, and the tape-guide-element support may have four projections arranged to correspond to the four openings in the pressure-member support. However, the projections may alternatively be provided on the abutment members instead of on the tape-guide-element support, in which case the tape-guide-element support is perfectly flat in the relevant area of its side portions. Alternatively, such projections may be provided both on the tape-guide-element support and on the abutment parts.

I claim:

1. A magnetic tape cassette, comprising:
   a) a housing having a plurality of peripheral walls, including a side wall, for enclosing a length of magnetic tape, said side wall having a magnetic head access opening for receiving a magnetic head, and said housing further including a pair of abutments adjacent said side wall, each abutment being arranged at a respective lateral side of said magnetic head access opening;
   b) a pressure member support comprised of a first blade spring extending adjacent said side wall between said abutments and said side wall, said pressure member support including a central portion opposite said access opening, side portions at each lateral side of said central portion extending along said abutments, and a pressure member on said central portion; and c) a tape guide element support comprised of a second blade spring extending adjacent said side wall between said side wall and said pressure member support, said tape guide element support including a central portion, two side portions at each lateral side of said central portion extending along said side portions of said pressure member support, and a pair of tape guide elements arranged mirror-symmetrically relative to said pressure member for guiding the magnetic tape past said magnetic head access opening;

said pressure member support having an opening, at each of its side portions, located opposite a respective said abutment, and at least one of (i) said abutments and (ii) said side portions of said tape guide element support which face said abutment, comprising projections extending into respective ones of said openings in said side portions of said pressure member support, said projections and said openings being arranged and dimensioned such that, with said pressure member support biased away from said side wall towards said abutments by a magnetic head inserted in said magnetic head access opening, said pressure member support contacts said abutments with its side portions bounding said openings, and said abutments and said side portions of said tape guide element contact each other at said projections, which extend through respective ones of said openings in said pressure member support, so that said pressure member support and said tape guide element support engage said abutments independently of each other.

2. A cassette as claimed in claim 1, characterized in that said pressure member support is elongate, and each said opening in a side portion of the pressure-member support is an elongate slot which extends in the longitudinal direction of the pressure-member support.

3. A cassette as claimed in claim 2, characterized in that said pressure member support has a longitudinal central axis, and in each side portion the pressure-member support has only one slot arranged substantially symmetrically relative to the longitudinal central axis of the pressure-member support.

4. A cassette as claimed in claim 3, characterized in that said projections are arranged on said side portions of the tape-guide-element support only at a face thereof facing the two abutments.

5. A cassette as claimed in claim 4, characterized in that said tape guide element support is elongate, and each projection on a side portion of the tape-guide-element support is an elongate embossment in the respective side portion, which embossment extends in the longitudinal direction of the tape-guide-element support.

6. A cassette as claimed in claim 5, characterized in that said type guide element support has a longitudinal central axis, and each side portion of the tape-guide-element support has only one embossment arranged substantially symmetrically relative to the longitudinal central axis of the tape-guide-element support.

7. A cassette as claimed in claim 2, characterized in that said projections are arranged on said two side portions of the tape-guide-element support only at a face thereof facing the two abutments.

8. A cassette as claimed in claim 7, characterized in that said tape guide element support is elongate, and each projection on a side portion of the tape-guide-element support is an elongate embossment in the respective side portion, which embossment extends in the longitudinal direction of the tape-guide-element support.

9. A cassette as claimed in claim 8, characterized in that said tape guide element support has a longitudinal central axis, and each side portion of the tape-guide-element support has only one embossment arranged substantially symmetrically relative to the longitudinal central axis of the tape-guide-element support.

10. A cassette as claimed in claim 1, characterized in that said projections are arranged on said two side portions of the tape-guide-element support only on a face thereof facing said abutments.

11. A cassette as claimed in claim 10, characterized in that said tape guide element support is elongate, and each projection on a side portion of the tape-guide-element support is formed by an elongate embossment in the respective side portion, which embossment extends in the longitudinal direction of the tape-guide-element support.

12. A cassette as claimed in claim 11, characterized in that said tape guide element support has a longitudinal central axis, and each side portion of the tape-guide-element support has only one embossment arranged substantially symmetrically relative to the longitudinal central axis of the tape-guide-element support.

13. A pressure-member support for a cassette having a housing with a pair of spaced abutments, said pressure member support comprising: a substantially elongate blade-spring having a central portion for securing a pressure member and, situated adjacent the central portion, two side portions for cooperating with the abutments of the cassette, the pressure-member support having an opening in each of the side portions at spaced locations opposite the abutments of the cassette housing.

14. A pressure-member support as claimed in claim 13, characterized in that said pressure member support is elongate, and each said opening in a side portion of the pressure-member support is an elongate slot which extends in the longitudinal direction of the pressure-member support.

15. A pressure-member support as claimed in claim 14, characterized in that said pressure member support has a longitudinal central axis, and in each side portion the pressure-member support has only one slot arranged substantially symmetrically relative to the longitudinal central axis of the pressure-member support.

16. A tape-guide-element support for a magnetic tape cassette having a housing with a pair of spaced abutments, said support comprising: a substantially elongate blade-spring including a central portion, two side portions which are situated adjacent the central portion for cooperating with the spaced abutments of the cassette housing, and two tape-guide elements for guiding a magnetic tape, in each of its side portions the tape-guide-element support has a projection for engaging a respective abutment of the magnetic tape cassette.

17. A tape-guide-element support as claimed in claim 16, characterized in that said tape guide element support is elongate, and each projection of the tape-guide-element support is an elongate embossment in the respective side portion, which embossment extends in the longitudinal direction of the tape-guide-element support.

18. A tape-guide-element support as claimed in claim 17, characterized in that said tape-guide-element support has a longitudinal central axis, and in each side portion the tape-guide-element support has only one said embossment arranged substantially symmetrically relative to the longitudinal central axis of the tape-guide-element support.

* * * * *